United States Patent [19]

Hoover et al.

[11] 4,161,717

[45] Jul. 17, 1979

[54] LOCKED AXLE DETECTOR FOR A MULTI-AXLE TRACTION VEHICLE

[75] Inventors: James W. Hoover; James Long, both of North East; Edward S. Matulevich, Erie, all of Pa.

[73] Assignee: General Electric Company, Erie, Pa.

[21] Appl. No.: 885,708

[22] Filed: Mar. 13, 1978

[51] Int. Cl.[2] .................. G08B 21/00; B60T 8/04
[52] U.S. Cl. ..................... 340/62; 180/179; 246/182 C; 303/103; 340/671; 361/242
[58] Field of Search ............ 340/52 B, 62, 671, 681; 180/105 E; 303/94, 103; 361/238, 242, 243; 244/111; 246/182 R, 182 C

[56] References Cited

U.S. PATENT DOCUMENTS

| 2,601,140 | 6/1952 | Hines | 340/671 X |
|---|---|---|---|
| 2,735,090 | 2/1956 | Maenpaa | 340/681 X |
| 2,778,008 | 1/1957 | Wilson et al. | 340/681 X |
| 2,959,772 | 11/1960 | Bruner | 340/681 X |
| 3,699,563 | 10/1972 | Cass | 340/681 X |
| 3,706,351 | 12/1972 | Neisch | 180/105 E X |
| 3,880,475 | 4/1975 | Booher | 244/111 X |
| 4,031,509 | 6/1977 | Matulevich | 340/62 |

Primary Examiner—John W. Caldwell, Sr.
Assistant Examiner—Joseph E. Nowicki
Attorney, Agent, or Firm—J. H. Beusse

[57] ABSTRACT

A multi-axle traction vehicle is equipped with apparatus for sensing the speeds of its respective drive axles, and control apparatus is provided for producing a predetermined warning signal if the sensed speed of one and only one of the axles is less than a predetermined low threshold level. In addition, apparatus is provided for inhibiting the control apparatus unless all but one of the sensed axle speeds are greater than a predetermined higher threshold level thereby minimizing the opportunity of producing a false warning signal.

7 Claims, 2 Drawing Figures

LOCKED AXLE DETECTOR FOR A MULTI-AXLE TRACTION VEHICLE

BACKGROUND OF THE INVENTION

This invention relates to multi-axled traction vehicles, and more particularly it relates to means for detecting a locked axle condition on such a vehicle.

A traction vehicle such as a railway locomotive has a plurality of axles for driving the wheels of the vehicle along a track. The axles are mounted in groups of two or three on two or more "trucks" with the vehicle itself mounted on the trucks. In operation one of the axles may become locked against rotation due to seizure of bearings or the like. If this condition were not promptly detected and corrected, it could have a number of adverse consequences, including the wearing of flat spots on the wheels. In order to minimize such difficulties, it is desirable to warn the engineer of the locomotive that a locked axle or a sliding wheel condition has occurred.

Accordingly, a general objective of the present invention is to provide an improved scheme on a multi-axle traction vehicle for detecting when one of the axles is locked.

It has heretofore been proposed to detect a locked axle condition on a multi-axle traction vehicle by suitably connecting speed detectors to monitor axle speed and to produce a warning signal when the sensed speed of any one of the axles is less than a predetermined first threshold level. Such a system is described in U.S. Pat. No. 4,031,509 granted on June 21, 1977 to E. S. Matulevich and assigned to the General Electric Company. This patented system also describes a "no-motion" arrangement which disables the system, thereby preventing it from producing the warning signal, except when the speed of the vehicle exceeds a second predetermined threshold indicating that the vehicle is in motion.

Although the above-described system is identified as a locked axle detector, it also functions as a wheel slip detector whenever the vehicle is moving at a speed less than the first predetermined threshold. At that speed a wheelslip, if it results in an axle exceeding the speed set by the second threshold, will cause the system to generate a warning signal. Because of its dual function as a locked axle and wheel slip detector, this system is susceptible to false signals. For example, a transient signal in any one of the speed detector circuits may cause a warning signal to be generated. Although a time delay is incorporated in the system to minimize the chances of producing a false warning signal, the adverse environment in a traction vehicle produces transient signals which may trigger the locked axle detection circuit.

It is an object of the present invention to provide a locked axle detection system which reduces the possibility of a false indication without detrimentally affecting the sensitivity of the system.

SUMMARY OF THE INVENTION

In carrying out our invention in one form, we provide on a multi-axle traction vehicle a plurality of detectors for sensing the speeds of the respective axles of the vehicle. The speed detectors are connected to a control system which is operative to produce a predetermined warning signal in response to the sensed speed of one and only one of the axles being lower than a predetermined first threshold (e.g., 5.0 miles per hour). The speed detectors are also connected to apparatus for disabling the control system except when at least one axle on each truck of the vehicle is turning at some predetermined second threshold level. Alternatively, the apparatus may be so arranged that the control system is disabled except when all but one axle is rotating at a velocity greater than the predetermined second threshold level.

BRIEF DESCRIPTION OF THE DRAWING

Referring now to FIG. 1, there is shown symbolically at 10 a traction vehicle such as a locomotive or transit car which has a plurality of drive axles. While just four axles 11, 12, 13, and 14 have been indicated in FIG. 1 by way of example, it will be understood that our invention is equally useful with multi-axle vehicles which are propelled by more than four. Paired wheels (not shown) are affixed to each axle.

Figure 1:
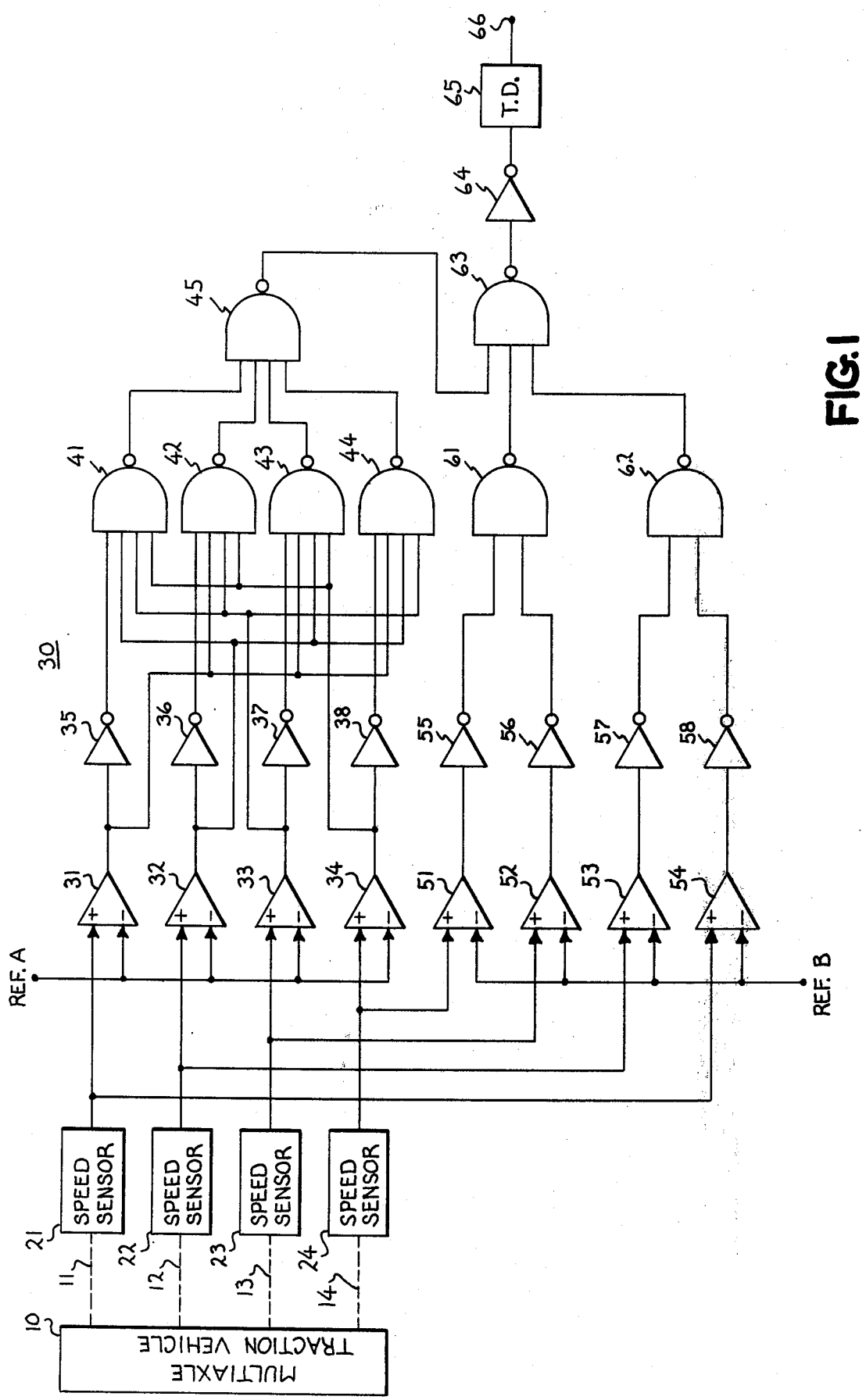
FIG. 1 is a schematic diagram of a circuit embodying our invention for detecting a locked axle on a multi-axle vehicle.

Coupled to the respective axles 11, 12, 13 and 14 are a corresponding number of duplicate speed sensing means of speed sensors 21, 22, 23 and 24. Each of these axle speed sensors is suitably constructed and arranged to generate an output signal "SPEED" which is representative of the speed of the associated axle. In the system of FIG. 1, an analog speed comparison is illustrated and accordingly each of the SPEED signals in a direct-current (d-c) signal whose magnitude is representative of the speed of an associated axle. However, it will be appreciated that in a digital system such as might be implemented using microprocessor apparatus, the SPEED signal would preferably be in digital form. An exemplary form of a speed sensor is described in the aforementioned U.S. Pat. No. 4,031,509, although for use with the illustrative embodiment of the present invention it is necessary to utilize the filtered speed representative signal from the speed sensor in order to effect an analog comparison.

The SPEED signals from all of the speed sensors are coupled to a logic means 30 which compares the SPEED signals to a predetermined first threshold level and produces a locked axle signal when one and only one of the SPEED signals is representative of an axle rotational velocity less than that represented by the first threshold level. In a preferred embodiment the logic means 30 comprises a plurality of duplicate comparison means 31, 32, 33 and 34 each having a first input terminal connected for receiving a SPEED signal from a corresponding one of the speed sensors 21, 22, 23 and 24. A second input terminal of each comparison means 31, 32, 33 and 34 is connected to a voltage source "REF A" which provides a signal having a voltage magnitude corresponding to the predetermined first threshold level. In the illustrated embodiment each of the comparison means 31-34 is suitably constructed and arranged to provide a signal of first logical significance, i.e., a logic 9 signal, whenever the magnitude of the corresponding SPEED signal is less than predetermined first threshold level established by "REF A" and to provide logical 1 output signals otherwise.

Logic means 30 also includes a plurality of duplicate logic inversion components 35, 36, 37, and 38 connected to an output terminal of a corresponding one of the comparison means 31, 32, 33 and 34, respectively.

The logical "one and only one" function is performed by a plurality of NAND logic circuits 41, 42, 43, 44 and 45 forming a portion of logic means 30. Each NAND circuit 41 through 45 has a number of input terminals corresponding to the number of speed sensing means from which the "one and only one" selection is to be made. One input terminal of each NAND circuit 41, 42, 43 and 44 is connected respectively to an output terminal of a corresponding one of the inversion components 35, 36, 37 and 38. The remaining input terminals of each NAND circuit 41-44 are connected to receive the non-inverted signals from the remaining ones of the comparison means 31, 32, 33 and 34. For example, the NAND circuit 41 has a first input terminal connected to an output terminal of logic inversion component 35 and has its three remaining input terminals connected respectively to output terminals of comparison means 32, 33 and 34. Each of the NAND circuits 41, 42, 43 and 44 has an output terminal connected to a corresponding input terminal of NAND circuit 45. This arrangement of NAND logic circuits is such that a logical 1 signal is developed at an output terminal of NAND circuit 45 if one and only one of the speed sensor signals is representative of an axle rotational velocity less than the predetermined first threshold level. Accordingly, the presence of a logical 1 signal at the output terminal of NAND circuit 45 is indicative of a locked axle condition.

In order to assure that the "one and only one" function truly indicates a locked axle condition, a further constraint is placed on the detection system, i.e., the locked axle indication is inhibited unless at least one axle on each truck of a multi-axle vehicle is rotating at a velocity greater than a predetermined second threshold level. This additional constraint establishes a dead-band within which a locked axle detection will not occur, but at the same time the constraint prevents erroneous locked axle detections which might be caused, for example, by differences in wheel diameters. The deadband may be empirically selected depending on the characteristics of the particular vehicle with which the locked axle detection system is utilized. In the aforementioned U.S. Pat. No. 4,031,509 a dead-band was suggested for vehicle speeds between 2.5 and 5.0 miles per hour. Clearly, it would be most advantageous to have the predetermined first threshold level, i.e., the 2.5 mph level, as small as possible in order to rapidly detect a locked axle condition. At the same time it would also be desirable to minimize the width of the dead-band. However, in general it is economically impractical to place exceedingly tight constraints on the system because of the variations from vehicle to vehicle and because of normal variations of the components in the system, including wear of the vehicle wheels. Accordingly, it is desirable to establish realistic threshold levels within the bounds of a practical application. For example, in a system which uses an axle alternator as a speed sensing device, such practical first and second threshold levels have been found to be 5.0 and 8.0 miles per hours, respectively.

The predetermined second threshold level is set by a voltage reference "REF B" signal supplied from a control voltage source (not shown). Each of the SPEED signals from speed sensors 21, 22, 23 and 24 is coupled to a first input terminal of a plurality of corresponding comparison means 51, 52, 53 and 54, respectively. The REF B signal is coupled to second input terminals of each of the comparison means 51-54 whereby each of the SPEED signals is compared to the REF B signal and a logical 1 output signal generated whenever the magnitude of the received SPEED signal is greater than the magnitude of the REF B signal. Thus, a logical 1 signal is generated when the measured axle rotational velocity is greater than the predetermined second threshold level.

Each of the comparison means 51, 52, 53 and 54 has an output terminal connected to an input terminal of a corresponding one of the logic inversion means 55, 56, 57 and 58. The logic inversion means 55 through 58 are effective to convert a received logical 1 signal to a logical 0 signal or conversely to convert a received logical 0 signal to a logical 1 signal. Output terminals of inversion means 55 and 56 are connected respectively to first and second input terminals of a NAND logic circuit 61. Output terminals of logic inversion means 57 and 58 are connected, respectively, to first and second input terminals of a NAND logic circuit 62. In the illustrated system it is assumed that the traction vehicle has two trucks for carrying the axles and that two axles of the four axle vehicle are mounted on each of the trucks. The comparison means 51 and 52 are connected to monitor the rotational velocity of the axles on one of the trucks and the comparison means 53 and 54 are connected to monitor the rotational velocity of the axles on the other of the trucks. Accordingly, the input signals to the NAND circuit 61 are from one truck, for example, the lead truck, and the input signals to NAND circuit 62 are from the other of the trucks which may be, for example, the trailing truck. The purpose of using the two NAND gates is to determine whether at least one axle on each of the trucks is turning at a rotational velocity greater than the second predetermined threshold level. The arrangement depicted in FIG. 1 will result in a logical 1 enable signal being developed at the output of the NAND logic circuits 61 and 62 whenever one of the associated axle rotational velocities is greater than the predetermined second threshold level.

Since it is desired to inhibit the operation of the locked axle detector in the event that the system does not indicate that at least one axle on each of the trucks is rotating at a velocity greater than the predetermined second threshold level, the output signals developed by NAND circuits 61 and 62 are combined in an additional NAND logic circuit 63 with the locked axle signal from NAND logic circuit 45. Thus, NAND logic circuit 63 has a first input terminal connected to an output terminal of NAND circuit 45, a second input terminal connected to an output terminal of NAND logic circuit 61 and a third input terminal connected to an output terminal of NAND logic circuit 62. Since the locked axle detection signal developed by NAND logic circuit 45 is established by a logical 1 signal, that signal will only be propagated through NAND logic circuit 63 if the signals developed by NAND logic circuit 61 and 62 are also logical 1 signals. Thus, the failure of the system to detect that at least one axle on each truck is rotating at a velocity greater than the predetermined second threshold level will result in the locked axle detection signal from NAND logic circuit 45 being inhibited at NAND logic circuit 63. As will be appreciated, a locked axle signal at the output of NAND logic circuit 63 is indicated by a logical 0 signal.

Since it is normally desirable to propagate logical 1 signals rather than logical 0 signals, the output terminal of NAND logic circuit 63 is connected to an additional logic inversion circuit 64 which converts the logic 0 signal to a logic 1 signal.

It will be seen that the output terminal of logic inversion means 64 is coupled to a time delay circuit 65 and that the ultimate locked axle signal is developed at an output terminal 66 at an output of the time delay circuit 65. The time delay circuit 65 may be of the type well known in the art such as, for example, the type illustrated in the aforementioned U.S. Pat. No. 4,031,509. As described in that patent, the time delay circuit 65 will delay production of the locked axle output signal for at least a predetermined length of time. This deliberate delay, which may by way of example be five seconds long, is provided to assure that the locked axle signal is actually indicative of a locked axle and not a transient signal which momentarily occurs and then disappears.

In the operation of the improved detector of FIG. 1, the speed sensors 21, 22, 23 and 24 continuously monitor the rotational velocity of the respective axles 11, 12, 13 and 14. The speed sensors 21 through 24 provide output signals representative of the rotational velocity of the monitored wheels. These output signals are compared with a reference signal REF A in a first group of comparators 31 through 34 which provide logic 0 output signals whenever the actual monitored speed is less than a speed established by the magnitude of REF A, i.e., a predetermined first threshold level. In the event that a monitored speed is less than the predetermined first threshold level, one of the NAND logic circuits 41 through 44 which continuously monitor the output signals developed by the comparators 31 through 34 will assume a logic 0 state if, and only if, only one axle is rotating at a velocity less than the predetermined first threshold level. A logic 0 signal at the output of one of the NAND logic circuits 41 through 44 will cause the NAND logic circuit 45 to generate a logical 1 signal or locked axle detection signal. However, the locked axle detection signal will be inhibited by NAND logic circuit 63 unless at least one axle on each of the trucks of the vehicle is rotating at a velocity greater than a second predetermined threshold level. The determination of the second criteria is made by comparing the speed signals developed by the speed sensors 21, 22, 23 and 24 to a second predetermined threshold level REF B in the comparison means 51, 52, 53 and 54. The signals developed by these latter comparison means 51 through 54 are combined into groups according to the trucks from which the signals originated. The combined signals are then coupled to respective NAND logic circuits 61 and 62 which provide essentially an ORing function to determine whether at least one axle on each of the trucks is rotating at the desired speed. The signals from the NAND logic circuits 61 and 62 are then coupled to additional input terminals of NAND logic circuit 63. If these signals are indicative of axle rotational velocity greater than the predetermined second threshold level, NAND logic circuit 63 will be enabled such that the locked axle signal from NAND logic circuit 45 will be coupled through the gate and applied to time delay circuit 65 via the logic inversion component 64. If the locked axle detection signal is available for a predetermined time period, e.g., 5 seconds, a signal will be developed at output terminal 66 indicating that a locked axle condition exists. This signal may then be applied to a control unit for the traction vehicle or merely to an operator's console as a warning signal as desired.

Figure 2:
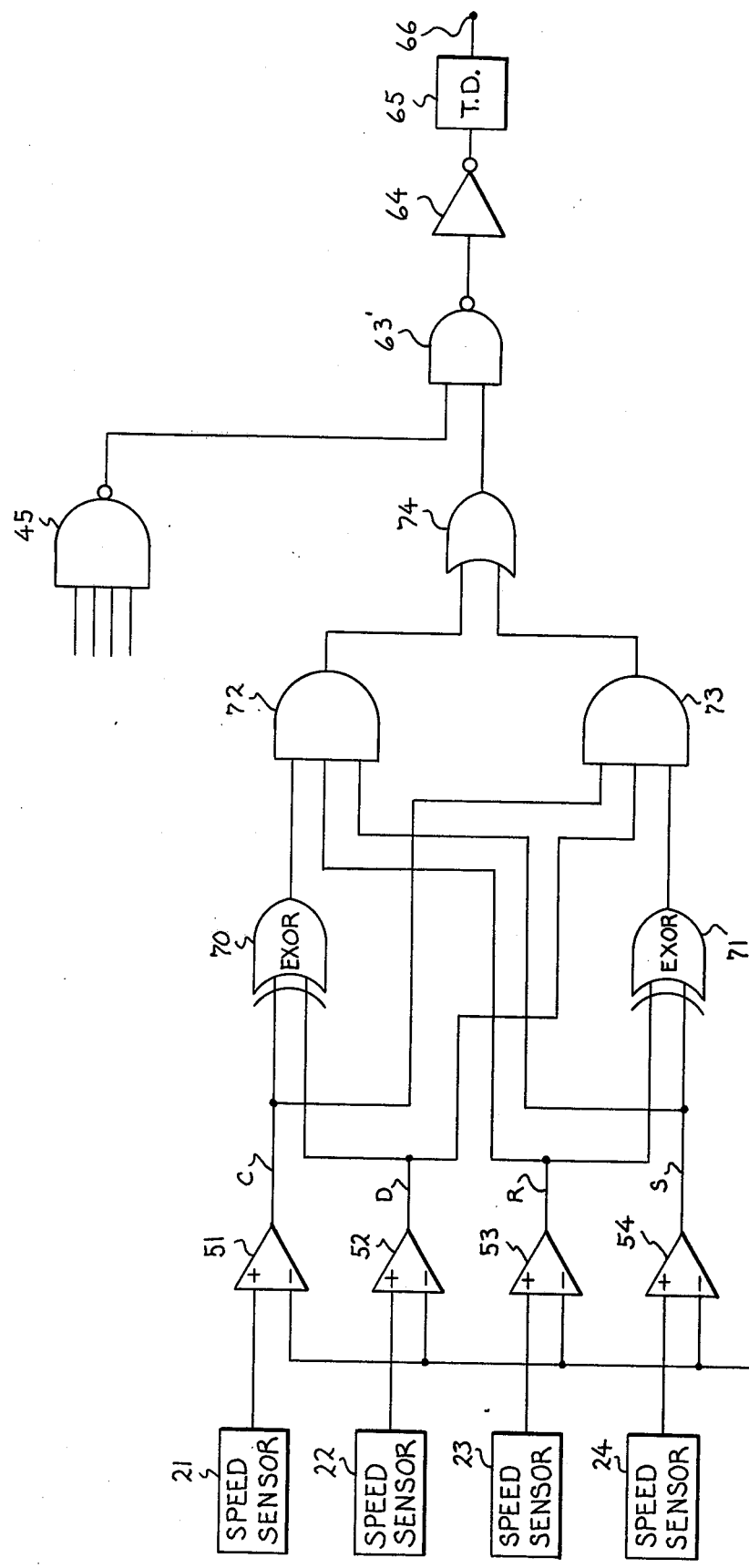
FIG. 2 is an alternative embodiment of the inhibiting portion of the circuit of FIG. 1.

A more restrictive inhibit logic arrangement for a locked axle detector is illustrated in FIG. 2. In this arrangement an inhibit of the locked axle signal is provided unless it is determined that all axles except one are rotating at a velocity greater than the second predetermined threshold level established by REF B. Referring to FIG. 2, the comparison means 51, 52, 53 and 54 are connected as in FIG. 1 for providing logical 1 output signals whenever the corresponding input SPEED signal is representative of an axle rotational velocity greater than the predetermined second threshold level established by REF B. The logic arrangement of FIG. 2 includes exclusive OR logic circuits 70 and 71, logical AND circuits 72 and 73, and a logical OR circuit 74. For purposes of illustration, logical 1 output signals developed by comparison means 51, 52, 53 and 54 are designated, respectively, C, D, R and S, with logical 0 signals being designated by $\overline{C}$, $\overline{D}$, $\overline{R}$, and $\overline{S}$.

Exclusive OR logic circuit 70 has first and second input terminals connected respectively to output terminals of comparison means 51 and 52. Similarly, exclusive OR logic circuit 71 has first and second input terminals connected respectively to output terminals of comparison means 53 and 54. As is well known, the two input exclusive OR circuit provides a logical 1 output signal if one and only one of its input signals is a logical 1 signal.

An output terminal of logic circuit 70 is connected to a first input terminal of AND circuit 72. Second and third input terminals of AND circuit 72 are connected respectively to output terminals of comparison means 53 and 54. An output terminal of AND circuit 72 is connected to a first input terminal of OR circuit 74.

The AND circuit 73 has a first input terminal connected to an output terminal of logic circuit 71. Second and third input terminals of AND circuit 73 are connected respectively to output terminals of comparison means 51 and 52. An output terminal of AND circuit 73 is connected to a second input terminal of OR circuit 74. Finally, an output terminal of OR circuit 74 is connected to at least one of the input terminals of NAND logic circuit 63', which circuit corresponds to circuit 63 of FIG. 1 but only receives two input signals rather than the previous three.

In operation the inhibit circuit of FIG. 2 solves the logical expression $RS(\overline{C}D + C\overline{D}) + CD(\overline{R}S + R\overline{S})$. As will be obvious, the parenthetical expressions are exclusive OR functions which are each ANDed with their counterparts from the other expression to determine that all but one signal are representative of axle rotational velocities greater than the predetermined second threshold level established by REF B. If, for example, logic circuit 70 produces a logical 1 output signal thereby indicating that one and only one of its input signals C or D is a logical 1, it will still be necessary for the R and S signals to be logical 1's before a logical 1 signal will be produced by AND circuit 72. Logic circuit 71 and AND circuit 73 similarly operate in conjunction to determine if one and only one of the signals R or S is a logical 1. In combination, the inhibit circuit of FIG. 2 assures that one and only one axle is rotating at less than the predetermined second threshold level and the previously described circuit of FIG. 1 determines whether that axle is rotating at less than the predetermined first threshold level and is therefore indicative of a locked axle condition.

While a preferred embodiment of our invention has been shown and described by way of illustration, many modifications will probably occur to those skilled in the art. We therefore intend, by the concluding claims, to cover all such modifications as fall within the true spirit and scope of the invention.

What we claim as new and desire to secure by Letters Patent of the United States is:

1. In a traction vehicle of the type having a plurality of axle carrying trucks and a plurality of axles on each of the trucks, an improved locked axle detector comprising:
   (a) speed sensing means associated with each of said axles for providing a plurality of speed signals, each of said speed signals being representative of the rotational velocity of a corresponding one of said axles;
   (b) first means connected for receiving said speed signals and for generating a locked axle signal when one and only one of said speed signals is representative of an axle rotational velocity lower than a predetermined first threshold level; and
   (c) second means connected for receiving said speed signals and for inhibiting said first means except when said speed signals are indicative of at least one axle on each of the trucks rotating at a velocity greater than a predetermined second threshold level.

2. The improvement of claim 1 wherein said first means comprises:
   (a) a plurality of comparison means for receiving corresponding ones of said speed signals and for comparing each of said speed signals to a reference signal representative of said predetermined first threshold level, each of said comparison means producing a logic signal of first logical significance when its corresponding speed signal is representative of an axle rotational velocity less than said first threshold level; and
   (b) logic means for receiving said logic signals and for producing a warning signal when one and only one of said logic signals is of first logical significance.

3. The improvement of claim 1 wherein said second means is connected for receiving said speed signals and for inhibiting said first means except when said speed signals are indicative of a condition wherein all but one of said axles are each rotating at a velocity greater than said predetermined second threshold level.

4. The improvement of claim 2 wherein said traction vehicle has four driven axles and said locked axle detector includes four corresponding speed sensors for producing said speed signals, said second means comprising:
   (a) comparison means for receiving said speed signals from each of said four speed sensors and for producing respective logic signals C, D, R and S in response to each of said speed signals being representative of axle rotational velocity greater than said predetermined second threshold level; and
   (b) logic means for receiving said logic signals and for inhibiting said first means except when the logical expression $RS(\overline{C}D+C\overline{D})+CD(\overline{R}S+R\overline{S})$ is determined to be true.

5. The improvement of claim 2 wherein said logic means comprises:
   (a) a plurality of logic inversion components, each of said inversion components being connected for receiving a corresponding one of said logic signals and for logically inverting said logic signal to produce an inverted logic signal;
   (b) a plurality of NAND logic components each having a number of inputs corresponding to the number of speed detectors, one of said inputs on each of said NAND logic components being connected for receiving said inverted logic signal from a corresponding one of said logic inversion components, each one of the remainder of said inputs on each of said NAND logic components being connected for receiving a corresponding one of said logic signals from the remainder of said comparison means; and
   (c) a NAND logic gate having an input terminal for each of said plurality of NAND logic components for receiving output signals from said components, said logic gate producing said warning signal at an output terminal thereof in response to a logical 0 signal from any of said NAND logic components.

6. In a traction vehicle of the type having a front truck and a rear truck, each of the trucks having a leading axle and a trailing axle, an improved locked axle detector comprising:
   (a) speed detector means operatively connected to each of said axles for providing a plurality of speed signals, each of said speed signals being representative of the rotational velocity of a corresponding one of said axles;
   (b) first means connected for receiving said speed signals and for generating a locked axle signal when one and only one of said speed signals is representative of an axle rotational velocity lower than a predetermined first threshold level;
   (c) second means connected to said speed detector means for receiving said speed signals corresponding to the axles of the front truck and for producing a first enable signal when at least one of said speed signals is representative of an axle rotational velocity greater than a predetermined second threshold level;
   (d) third means connected to said speed detector means for receiving said speed signals corresponding to the axles of the rear truck and for producing a second enable signal when at least one of said speed signals is representative of an axle rotational velocity greater than said predetermined second threshold level; and
   (e) logic means connected for receiving said locked axle signal and said first and second enable signals, said logic means inhibiting said locked axle signal in the absence of said first or second enable signals whereby production of said locked axle signal at an output terminal of said locked axle detector is inhibited unless at least one axle on each of said trucks is rotating at a velocity greater than said predetermined second threshold level.

7. The improvement of claim 6 and including a time delay circuit serially connected between said logic means and said output terminal of said locked axle detector for delaying said locked axle signal for a predetermined time period.

* * * * *